United States Patent Office 3,050,560
Patented Aug. 21, 1962

3,050,560
PREPARATION OF DIMETHYL HYDRAZINE
Carl L. Randolph, Jr., Whittier, and Ralph E. Meyer, Duarte, Calif., assignors to Aerojet-General Corporation, Azusa, Calif., a corporation of Ohio
No Drawing. Filed Feb. 15, 1954, Ser. No. 410,412
6 Claims. (Cl. 260—583)

This invention relates to a new method of preparing unsymmetrical dialkyl hydrazines and in particular to a method for preparing dimethyl hydrazine.

Hydrazine for many years has found extensive use as a rocket fuel because of its high specific impulse. Unfortunately, however, hydrazine has a freezing point of about 33° F. making it necessary to add freezing point depressants to permit its use as a rocket fuel under ordinary operating conditions. However, it has been observed that such additives also depress the specific impulse of the fuel thereby decreasing the efficiency of the engine.

It has now been found that dimethyl hydrazine has a specific impulse approximating that of hydrazine and a freezing point of −70° F. thereby permitting its use as a rocket fuel without additives.

Although dimethylhydrazine was first prepared as early as 1875, there have been no methods heretofore available which would permit its production on a commercial scale, and hence its use as a rocket fuel has been severely restricted.

By the practice of this invention dialkyl hydrazines can be produced on a tonnage basis, utilizing cheap, readily available, starting materials with a minimum of handling, thereby making the use of dimethyl hydrazine as a rocket fuel an economic possibility. We have found that alkyl chloramines will react with liquid ammonia at room temperature to yield dialkyl hydrazines in accordance with the general reaction scheme set forth below, wherein R is a lower alkyl radical:

$$R_2NCl + NH_3 \rightarrow R_2N-NH_2 \cdot HCl$$

In order to determine optimum reaction conditions for this procedure, a series of experiments was performed under various conditions. In order to illustrate more clearly this invention the results of these experiments are submitted in tabular form below. The reactions were all conducted in sealed ampoules under the conditions set forth in the table. Dimethyl chloramine was weighed into the amopules and subsequently liquid anhydrous ammonia was distilled in. The ampoules were then sealed, warmed to the reaction temperature and allowed to stand for the indicated time. After opening the tubes, the ammonia was vaporized and the white solid residue of dimethyl hydrazine hydrochloride was dissolved in water and titrated with potassium iodate to determine the yield.

As may be seen from the results given above the reaction temperature does not appear to be critical so long as it is above 0° C.

It may also be observed that the presence of alkali does not significantly affect the yield.

The corresponding bromo and iodo derivatives may be used in the practise of this invention in place of dialkylchloramines.

The reaction may also be conducted in the vapor phase as well as in aqueous solution at a pH above 7; the only critical limitation being temperature.

Liquid ammonia is a readily available commercial item. The halo amines used as starting materials, although not presently available on a tonnage basis can be prepared in large quantities at extremely low cost. Dimethyl chloramine by way of illustration can be prepared by the action of aqueous sodium hypochlorite solution upon dimethyl amine hydrochloride or even more economically from alkali, chlorine and dimethylamine all of which are cheap and readily available.

In view of the commercial availability of the starting materials used in this process as well as the ease in recovering the final product, it is at once apparent that this method will have wide applicability for industrial production of unsymmetrical dialkyl hydrazines.

Although slight reductions in yield may be predicted by the increase in chain length of the alkyl component, nevertheless it is apparent that this method can be employed to synthesize the higher homologues of dimethyl hydrazine as well.

We claim:

1. The method of preparing unsymmetrical lower dialkyl hydrazine hydrohalide which comprises reacting a lower dialkyl halo amine with ammonia at a temperature above about 0° C.

2. The method of preparing unsymmetrical dimethyl hydrazine hydrochloride which comprises reacting dimethyl chloramine with ammonia at a temperature above about 0° C.

3. The method of preparing unsymmetrical dimethyl hydrazine hydrochloride which comprises reacting dimethyl chloramine with liquid ammonia in a sealed vessel at a temperature above about 0° C.

4. The method of preparing unsymmetrical dimethyl hydrazine hydrochloride which comprises reacting dimethyl chloramine with liquid ammonia at a temperature of about 20° C.

5. The method of preparing unsymmetrical lower dialkyl hydrazines which comprises reacting a lower dialkyl halo amine with ammonia at a temperature above about 0° C. in the presence of potassium hydroxide.

6. The method of preparing unsymmetrical dimethyl hydrazine which comprises reacting dimethyl chloramine with ammonia at a temperature above about 0° C. in the presence of potassium hydroxide.

| Expt. No. | Reaction Time, min. | Grams $(CH_3)_2NCl$ | ml. liq. $NH_3$ | Grams KOH | $NH_3$ Pressure, p.s.i. | Temp., °C. | Percent Yield Dimethyl Hydrazine |
|---|---|---|---|---|---|---|---|
| 1 | 10 | 0.450 | 5.0 | 1.0 | unknown | 0 | 0 |
| 2 | 35 | 0.420 | 5.0 | 1.0 | 130 (approx.) | 20 | 30.5 |
| 3 | 35 | 0.426 | 5.0 | 0.0 | 130 (approx.) | 20 | 21.5 |
| 4 | 45 | 0.391 | 5.0 | 1.0 | 130 (approx.) | 20 | 22.5 |
| 5 | 45 | 0.448 | 5.0 | 0.0 | 130 (approx.) | 20 | 26.7 |
| 6 | 90 | 0.391 | 5.0 | 1.0 | 130 (approx.) | 20 | 22.5 |
| 7 | 16 hr. | 0.418 | 5.0 | 1.0 | 130 (approx.) | 20 | 27.5 |
| 8 | 16 hr. | 0.323 | 5.0 | 0.0 | 130 (approx.) | 20 | 24.7 |
| 9 | 90 min. | 0.5 (approx.) | 5.0 | 1.0 | 230 | 105 | 20.0 |

References Cited in the file of this patent

UNITED STATES PATENTS 2,808,439 Barrett et al. _____ Oct. 11, 1957

OTHER REFERENCES

Westphal: Berichte, 74B (1941), pages 759, 760.